Figure 9:
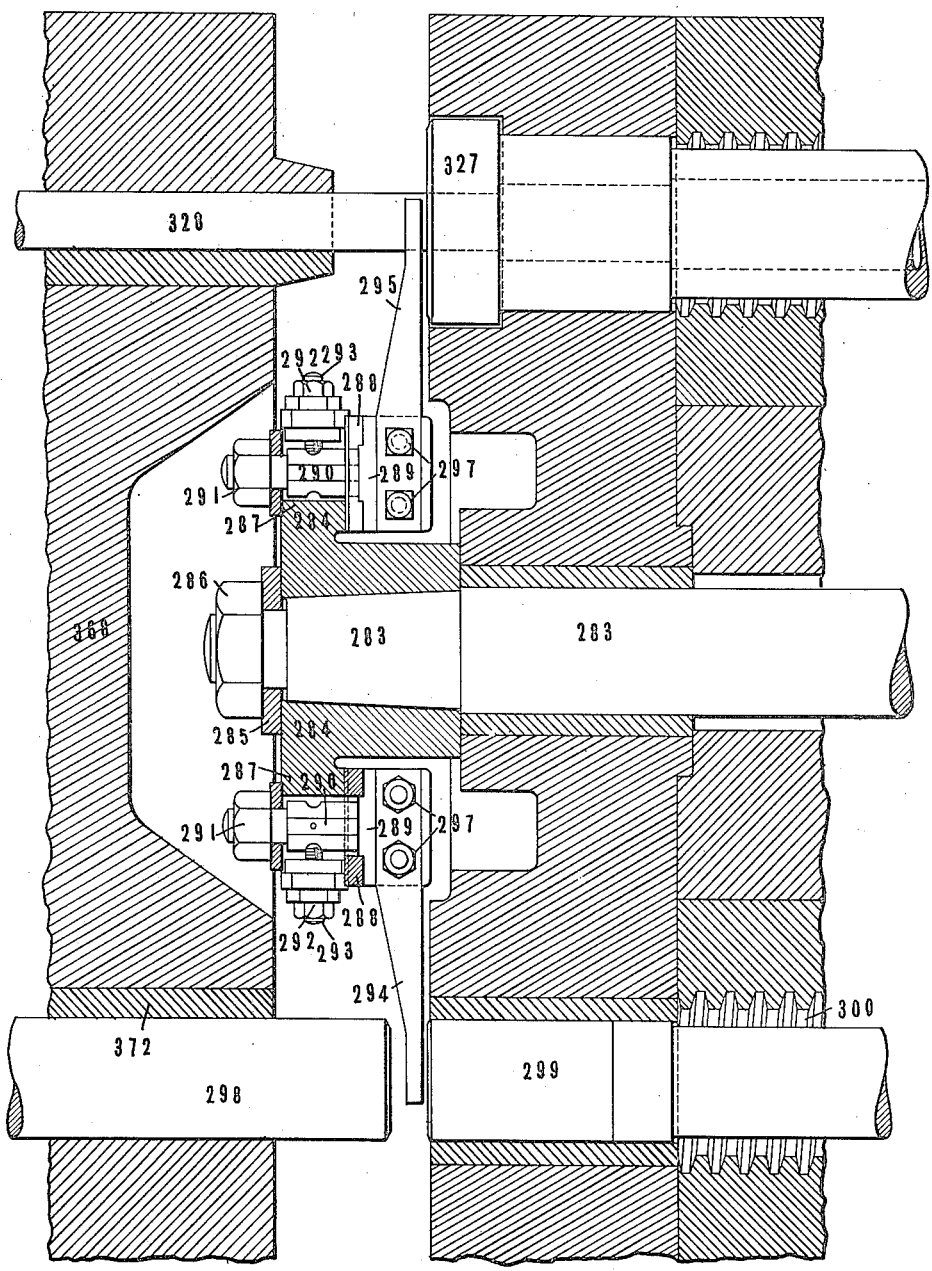

W. L. WARD, H. D. REMSEN & E. C. BOERNER.
NUT MAKING MACHINE.
APPLICATION FILED APR. 27, 1912.
1,203,824.
Patented Nov. 7, 1916.
10 SHEETS—SHEET 1.
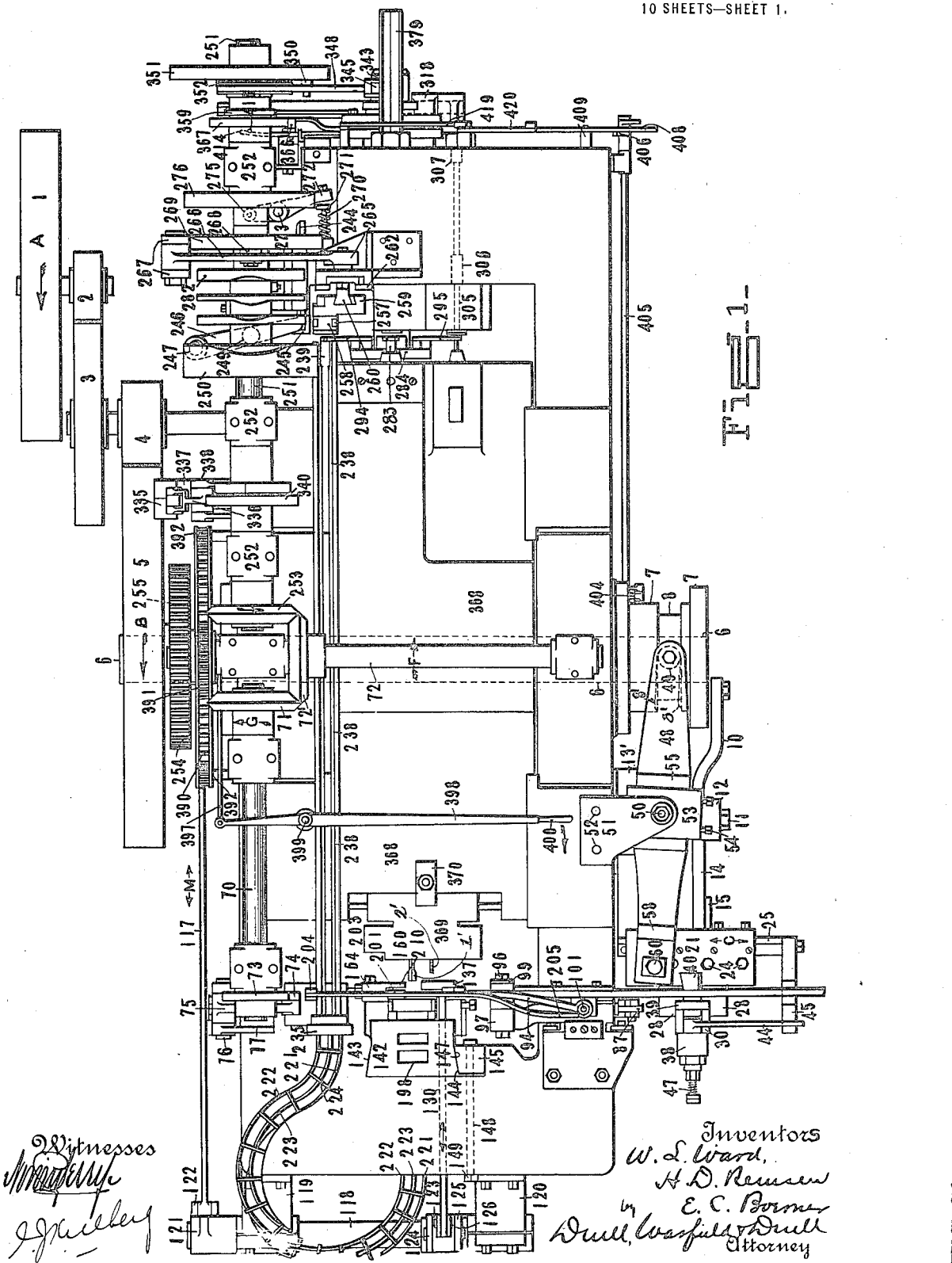

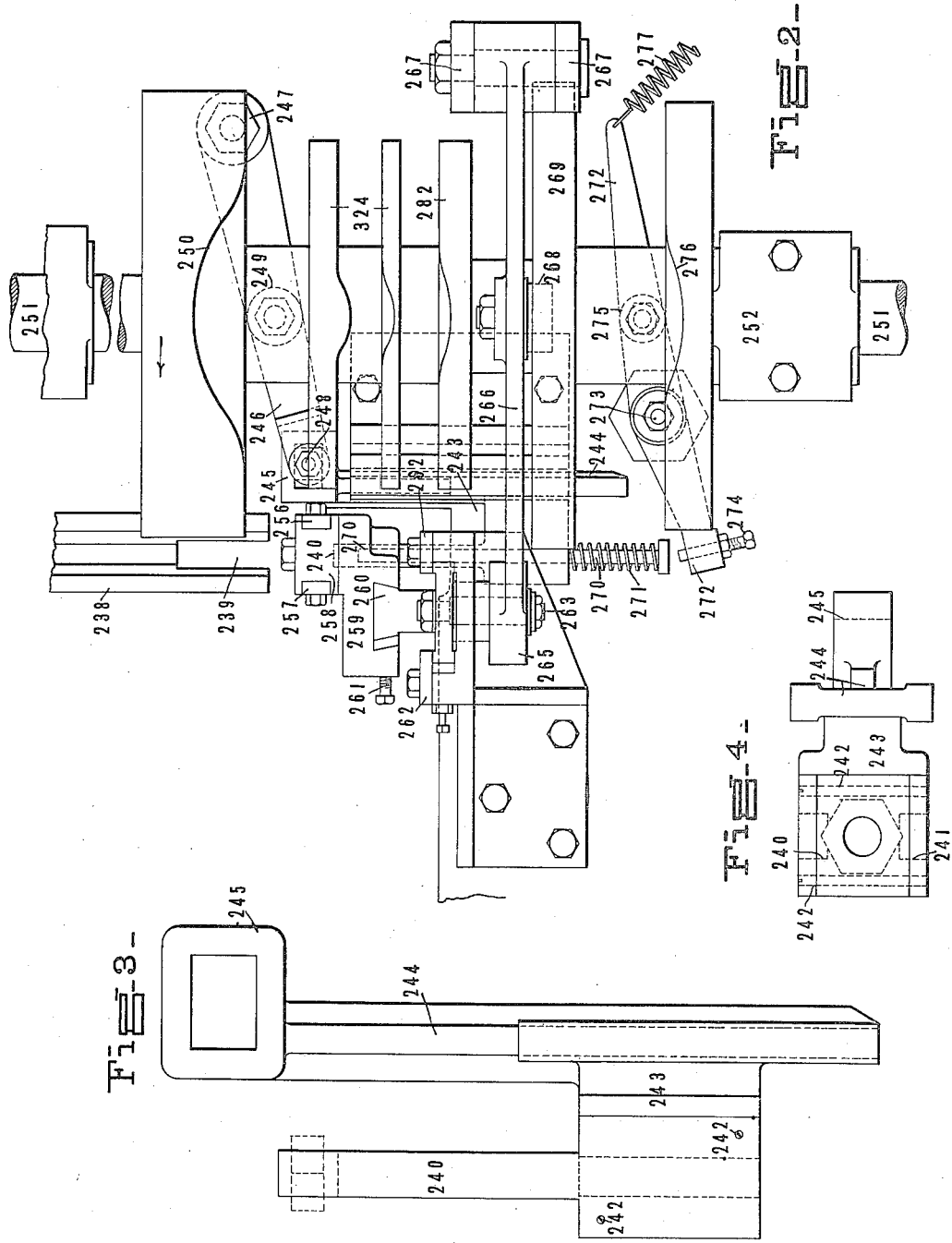

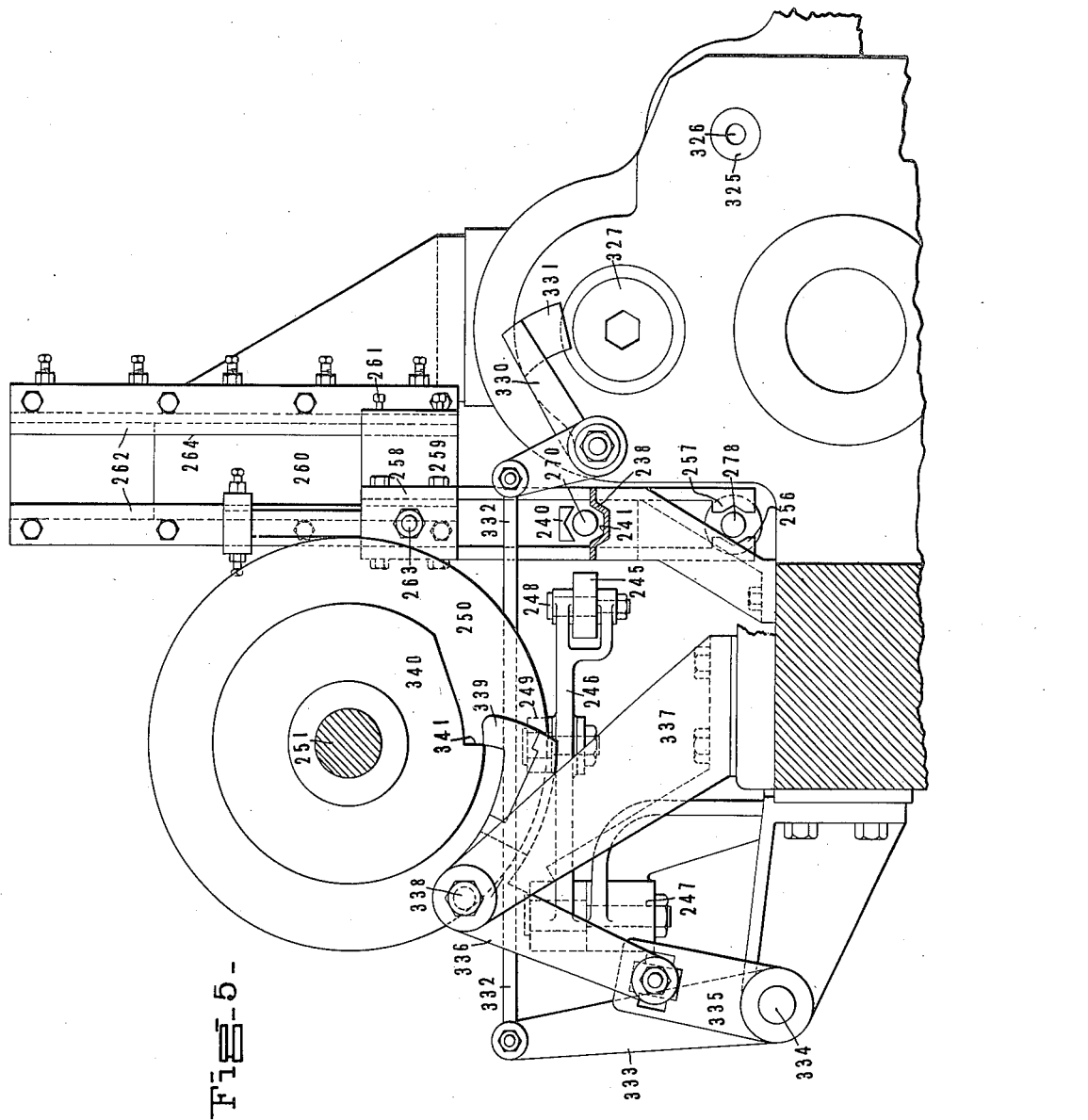

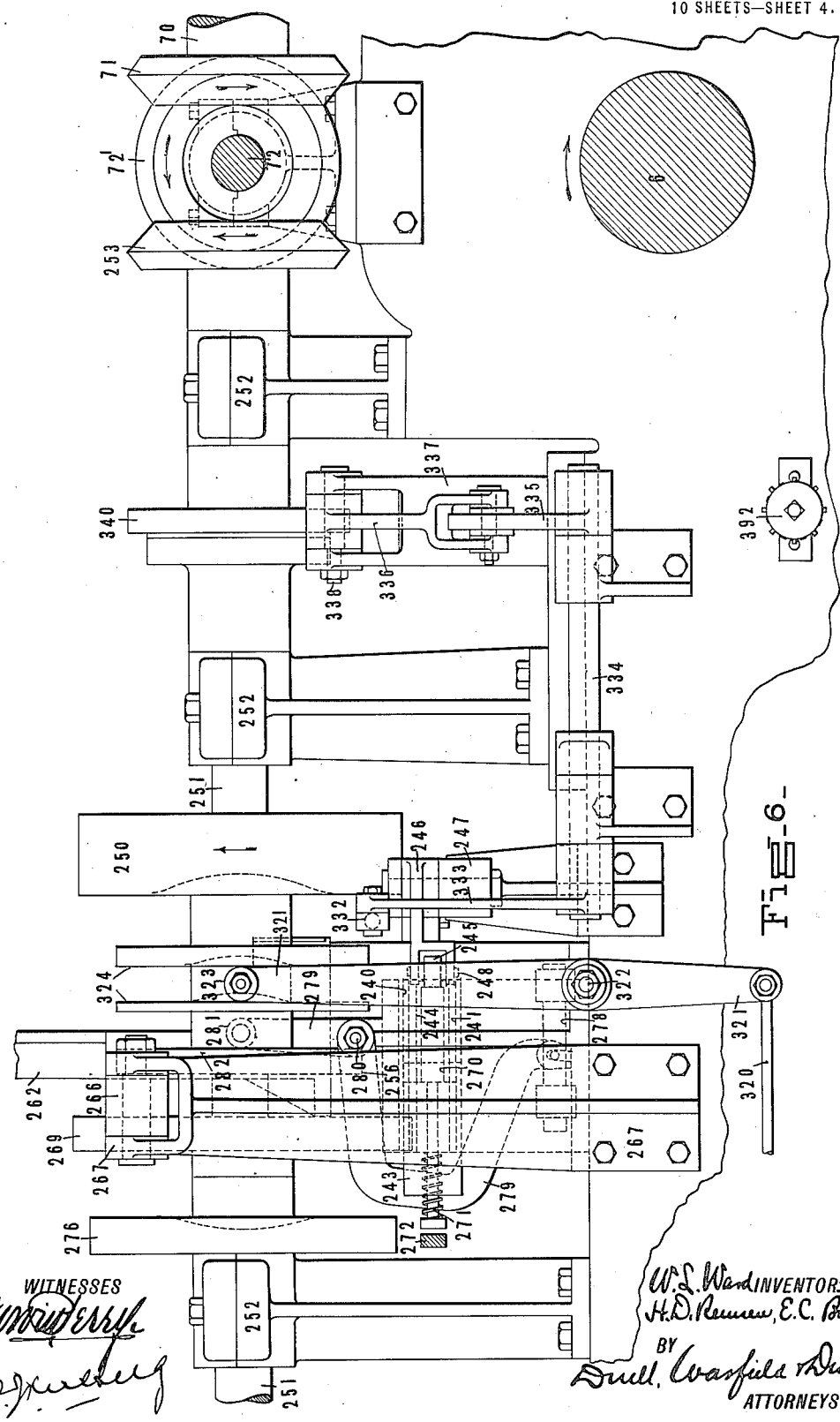

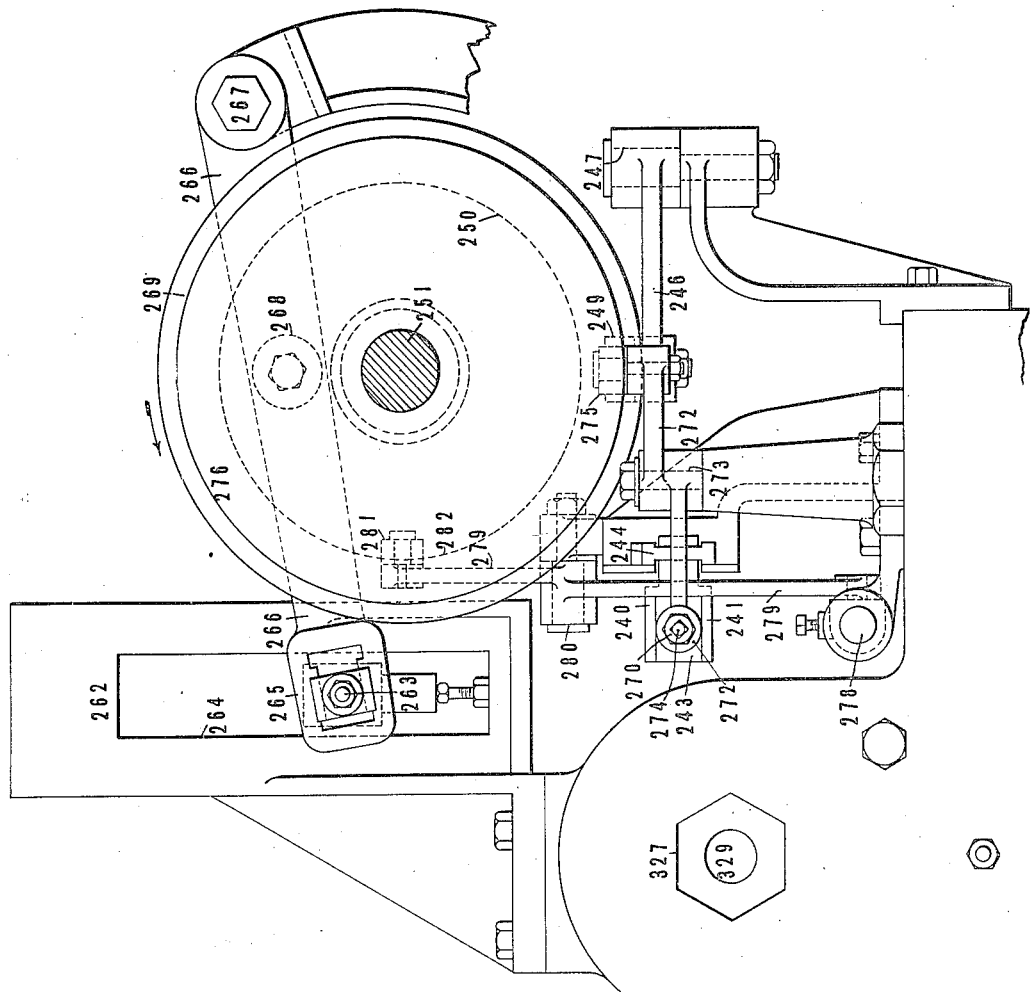

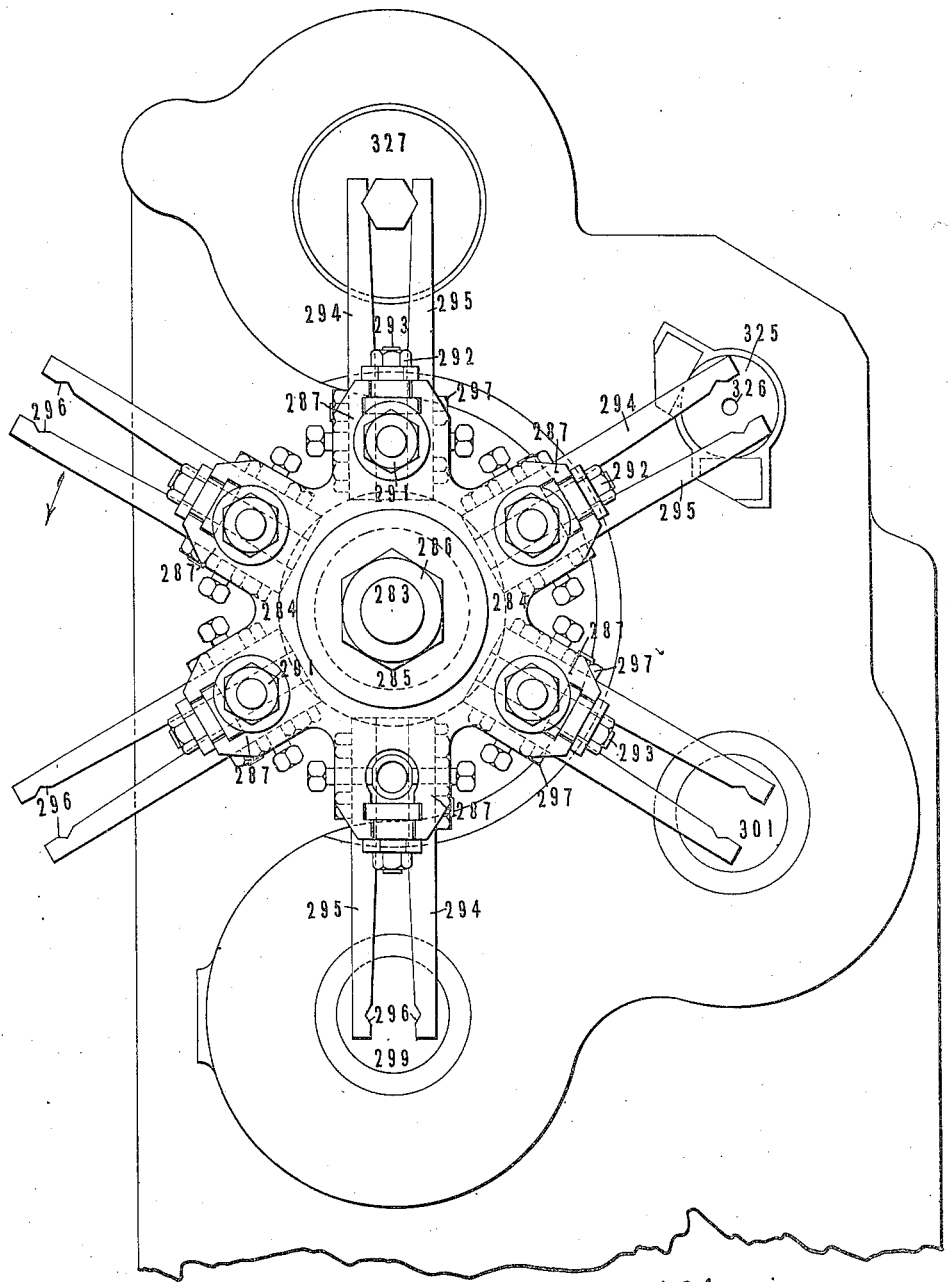

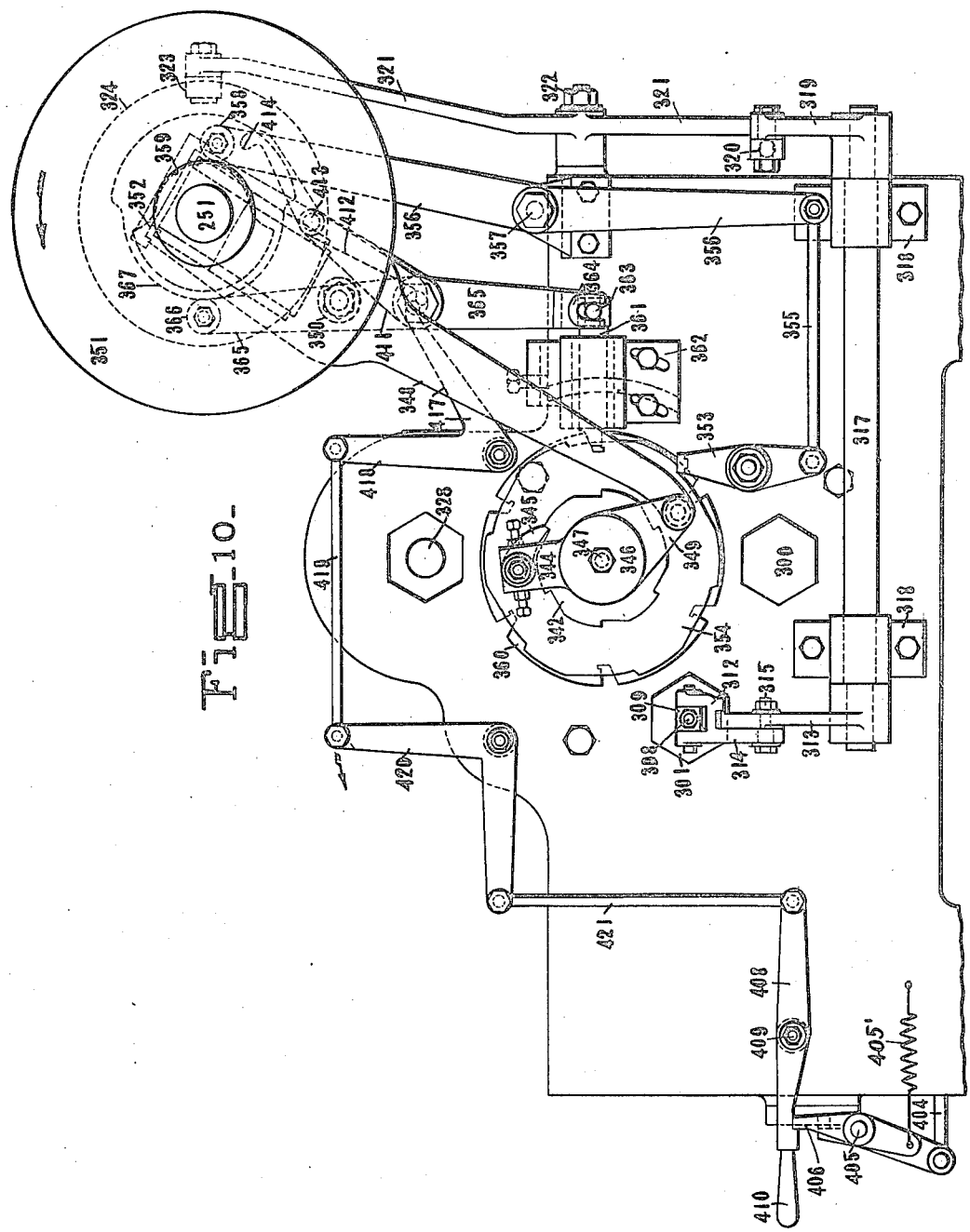

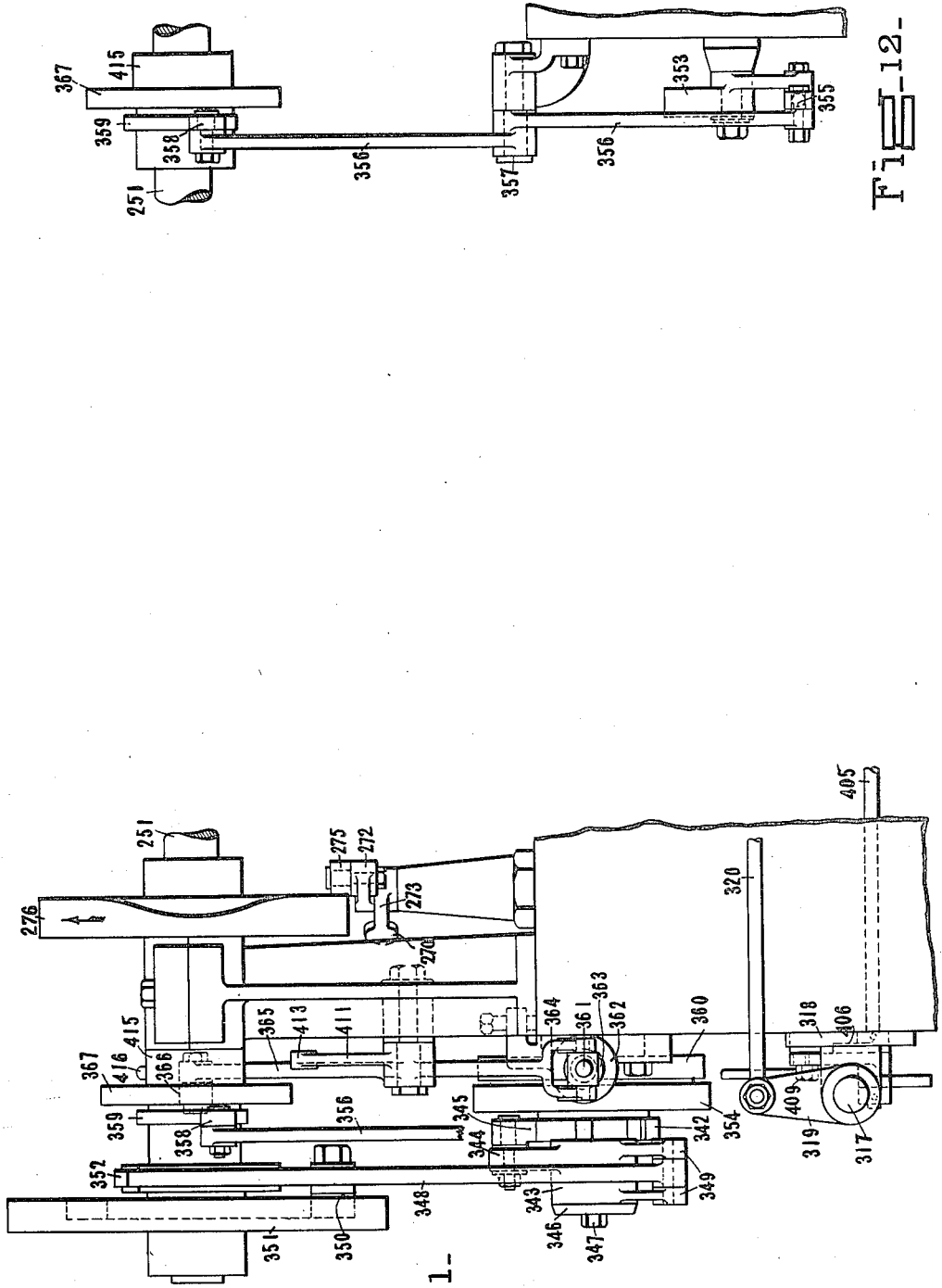

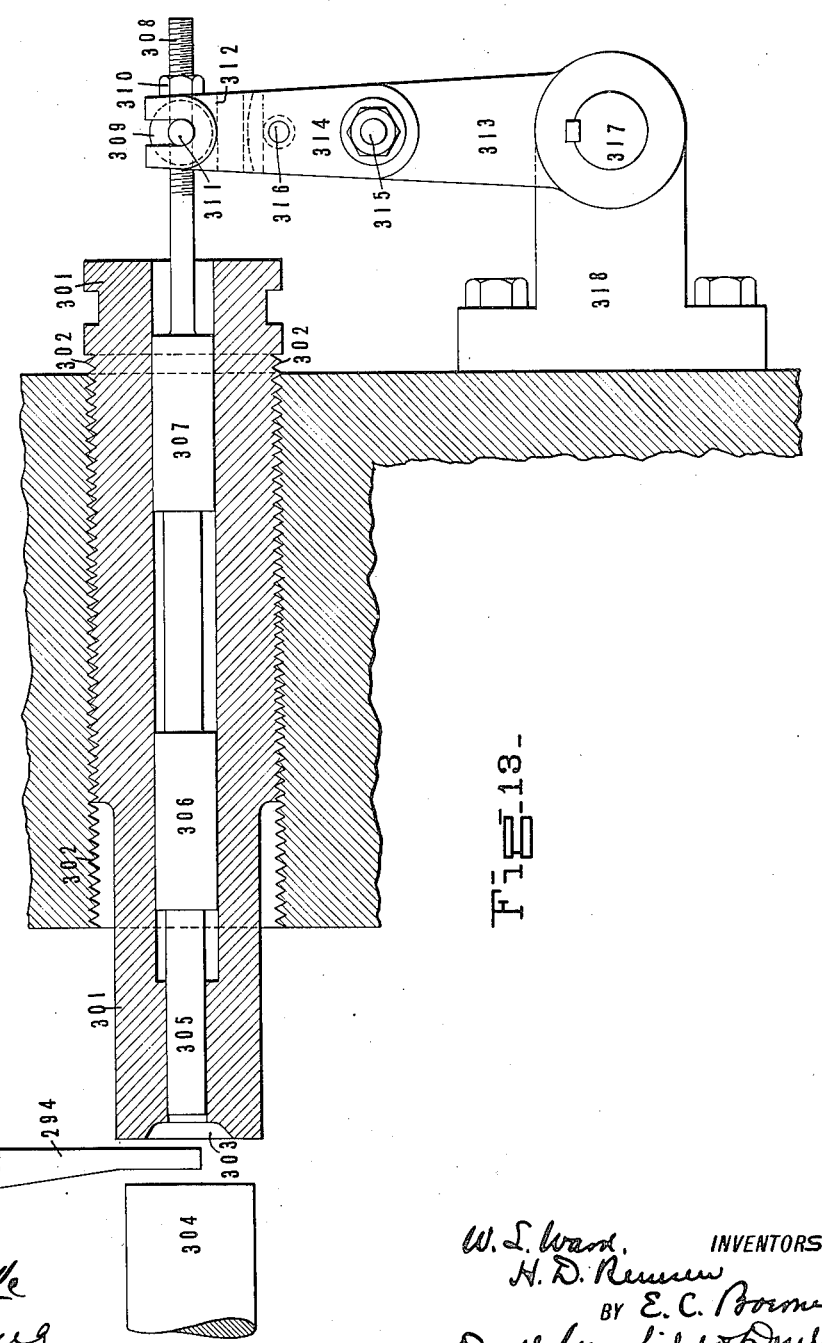

UNITED STATES PATENT OFFICE.

WILLIAM L. WARD, HERBERT D. REMSEN, AND EMILE C. BOERNER, OF PORT CHESTER, NEW YORK, ASSIGNORS TO RUSSELL, BURDSALL & WARD BOLT AND NUT CO., OF PORT CHESTER, NEW YORK, A CORPORATION OF NEW YORK.

NUT-MAKING MACHINE.

1,203,824.      Specification of Letters Patent.      Patented Nov. 7, 1916.

Original application filed June 27, 1910, Serial No. 569,053. Divided and this application filed April 27, 1912. Serial No. 693,607.

*To all whom it may concern:*

Be it known that we, WILLIAM L. WARD, HERBERT D. REMSEN, and EMILE C. BOERNER, citizens of the United States, residing at Port Chester, in the county of Westchester and State of New York, have invented certain new and useful Improvements in Nut-Making Machines, of which the following is a full, clear, and exact description, such as will enable others skilled in the art to which it appertains to make and use the same.

This invention deals with mechanism which, upon receiving articles from a delivering means such as a transfer mechanism, will thereupon accurately bring such an article into successive positions in each of which it may be acted upon by a die or the like provided in a machine such, for example, as that set forth in a copending application filed June 27, 1910, Serial No. 569,053, patented February 24, 1914, No. 1,088,192, of which this application is a division.

One object of the invention is to provide a mechanism whereby a blank, and especially a nut-blank, may be seized initially and thereupon passed successively into the action of each of a plurality of implements while always held in the original grip; thus avoiding inaccuracies arising from slight changes in position of the blank in its holder.

Another object is to adopt for a conveyer delivering a train of blanks a mechanism for successively removing blanks from the delivery end thereof and to subject such blanks to a series of forming operations, without having the precision and regularity of the operation impaired by the ordinary variations in the travel of the train of blanks.

Other objects and advantages will be in part pointed out hereinafter and in part rendered apparent by means of the accompanying illustrations.

The invention accordingly consists in the features of construction, combinations of elements and arrangement of parts which will be exemplified in the construction hereinafter set forth, and the scope of the application of which will be indicated in the following claims.

To promote a full understanding as to the manner in which this invention may be carried out, drawings exemplifying a preferred embodiment have been appended as a part of this disclosure, and in such drawings like characters of reference denote corresponding parts throughout the several views, of which—

Figure 1 is a general assembly of a complete machine in which is embodied the mechanism herein specifically claimed; Fig. 2 is a plan view showing the delivery end of the conveyer for the nut-blanks and the transfer mechanism for picking nut-blanks from the end of such conveyer and transporting the same to a roulette which carries the blanks through the successive operations of repunching, crowning, retrimming, etc.; Fig. 3 is a detail view of the spring finger or picker forming an element of the transfer mechanism and which comprises two spring arms or tongs adapted to be advanced to spring over and frictionally take hold of a nut-blank located at the extremity of the conveyer 238, then withdraw the same from such conveyer, and ultimately position the same between vertically movable fingers which carry the nut-blank to the roulette; Fig. 4 is a rear end elevation of the picker shown by Fig. 3; Fig. 5 is an elevation of the transfer mechanism as viewed from the end of the nut-blank conveyer, looking in the direction of travel of the nut-blanks, i. e., toward the rear end of the machine; Fig. 6 is a side elevation, showing in part certain of the unobstructed elements of Figs. 2 to 5 inclusive, and disclosing more particularly the arrangement of the cams, levers and other elements which operate the transfer mechanism; Fig. 7 is an end elevation looking forwardly in the direction of the axis of the cam shaft 251 and showing more particularly the lever which actuates the vertically moving tong mechanism, as well as the levers which operate the plungers for transferring the blanks from the horizontally moving tong mechanism to the vertically moving tong mechanism and for transferring them from the latter to the roulette, which carries them through subsequent operations; Fig. 8 is an end elevation showing details of construction of the roulette; Fig.

9 is a longitudinal vertical section showing further retails of the construction of the roulette; Fig. 10 is an end elevation of a machine embodying the roulette mechanism, illustrating certain details of the means for rotating the same; Fig. 11 is a side elevation of the means illustrated by Fig. 10; Fig. 12 is a further view of certain of the parts appearing in Fig. 11; and Fig. 13 is a vertical section taken through the crowning die, showing in detail the ejector mechanism therefor.

*The conveyer.*—Turning to Fig. 1, there will be seen a track-like slide 238 which will normally be loaded with blanks which will be successively introduced into one end, and pushed along toward the discharge end, from which they are successively removed by the apparatus now to be described.

*The mechanism for transferring the nut-blanks from the conveyer to the roulette.*—It may be perceived at this point that, owing to the somewhat rough and irregular contour of the nut-blanks which are pushed along the conveyer in the form of a long train of blanks, the foremost nut-blank may be more or less displaced in its position. That is to say, at one time the foremost unit of the train of nut-blanks may be well advanced with respect to the extremity of the conveyer, and at another time it may be positioned more to the rear of such extremity. On the other hand, in an automatic machine of this character one highly important attribute to smoothness and positiveness of action will reside in an accurate and unfailing placing of the nut-blanks. In order, therefore, to provide a mechanism having the capacity of compensating for the variable positions of the nut-blanks at the delivery end of the conveyer, this invention proposes to intervene what may be termed a picker mechanism between the conveyer and the roulette which carries the nuts through the various finishing operations, such as crowning, repunching, retrimming and the like. According to this invention a device such as that shown by Fig. 3 and comprising a pair of tong-like spring arms is mounted adjacent the extremity of the conveyer and adapted to horizontally reciprocate so as to advance into engagement with the nut-blank carried at the end of said conveyer and withdraw the same therefrom, and thus positively position the same in a predetermined vertical plane. This mechanism is shown more plainly by Figs. 2 to 6 inclusive.

Turning first to Figs. 3 and 4, a pair of spring fingers or tongs 240 and 241 are secured, by means of screws such as 242 to a block 243 so as to lie parallel with one another, but spaced apart approximately somewhat less than the maximum diagonal of a nut-blank. This block 243 is mounted to slide in a horizontal direction in a suitable stationary part of the frame of the machine, as shown by the drawings, and is actuated through an extension 244, which terminates in the slotted end 245. An actuating lever 246 is pivoted at its one end to the pivot pin 247 and at its other end carries the pin 248, which moves in the slot in the end 245. This lever is actuated by means of the roller 249 which rides in contact with the periphery of the cam 250 which is fixed to shaft 251 mounted in journal boxes 252 arranged at one side of the machine. Roller 249 may be held in contact with cam 250 by any suitable means, such as the usual spring. This shaft is in turn driven by the beveled gear 253 in mesh with the gear 72' which is secured to the shaft 72, which at one end carries the gear 254 in mesh with the gear 255 mounted on the main shaft 6. As a result of this mechanism, the spring fingers or tongs 240 and 241 are caused to advance toward the end of the nut-blank conveyer 238 and, by reason of the slot 239 they are able to pass over and frictionally grip the nut-blank at the head of the train of blanks. Consequently, during the withdrawal of the spring fingers or tongs 240 and 241, this nut-blank will be removed and carried to a position such that it may be engaged by a second pair of tongs which are arranged to slide vertically and transversely to the movement of said first-mentioned tongs. The second tongs are shown more clearly by Figs. 5 and 2 and indicated by reference numerals 256 and 257. These second tongs are secured to a block 258 fixed to a member 259, which is in turn adjustably fixed in position on a vertically reciprocating block 260 by means of the screws 261. This block slides vertically in the ways 262, and has a pivot pin 263 projecting rearwardly through slot 264 in the vertical ways 262 (see Fig. 7). This pivot pin 263 carries a conventional form of sliding block which slidably connects with the end 265 of the vertically oscillating lever 266. This lever is pivoted at its distant end to the pivot 267 and is actuated by means of an intermediately located roller 268 in engagement with the cam 269 (see Figs. 2 and 6), also fast to the shaft 251.

It will, from the foregoing, be understood that when the first tong mechanism withdraws the nut-blank from the end of the conveyer, such blank is to be transferred to the vertically moving pair of tongs. This is accomplished by means of an upper plunger 270, which reciprocates between the tongs 240 and 241, and which is normally held in a retracted position by means of the spring 271 (see Fig. 2). At the proper instant, this plunger is advanced and pushes the nut-blank from between the tongs 240 and 241, and then between the tongs 256 and 257, it being, of course, understood that the latter tongs are now in their elevated position through the operation of the lever 266. The means for operating the plunger 270 consists in a lever 272 (shown more clearly by Figs. 2 and 7), which is pivoted at an intermediate point to the pivot pin 273 carried by a suitable standard rising from the frame of the machine. The actuating end of this lever carries an adjustable screw 274 which, during the forward advance of the lever impacts against the end of the plunger 270 and in turn advances the same. The lever 272 is actuated by means of a roller 275 which contacts with the cam 276 fixed to the shaft 251. A spring 277 (shown in Fig. 2) operates to keep the roller 275 properly pressed against the cam surface 276. The spring 277 is stronger than the spring 271.

In order to transfer the blanks from the vertically moving tongs, this invention proposes a lower plunger 278. This is shown more clearly by Figs. 5, 6 and 7. This plunger 278 reciprocates horizontally and is pivotally connected with an uprising bent lever 279, which is pivoted at 280, and at its upper end carries the roller 281 which rides around the cam 282 and is intermittently actuated thereby. Roller 281 may be held in contact with the cam 282 by any suitable means, such as the usual spring. Consequently, each time the plunger 278 operates, a nut-blank will be forced from the vertically moving tongs and will be received by the adjacent spoke of the roulette or spoke-like structure, as will be presently described. Through this mechanism the blanks are very certainly and accurately positioned and transported through the several finishing operations.

*The roulette for carrying the nut blanks through the successive finishing operations.*—The detailed construction of the preferred form of roulette is shown more particularly by Figs. 8 and 9. A shaft 283 passes from the rear or discharge end of the machine through the main frame, and terminates adjacent the end of the double-headed reciprocating punch-carrying frame. At its forward end, this shaft tapers and carries the hub 284 of the roulette. This hub is securely retained in position by means of a pressure plate 285, which is positioned by the nut 286 on the end of the shaft 283. The hub of this roulette provides a series of equi-spaced radiating spoke-like members 287, 287, 287, and, inasmuch as these are similar in character, but one need be described. This radiating portion extends to the rear, *i. e.*, in an axial direction, a little less than one-half the total length of the hub 284 and provides a grooved channel or trackway in which an intervening block 288 may slide in a radial direction, but is restrained against any other movement relative to the part 284. A tong-block 289 has a transverse movement on the intervening block 288, as shown more clearly by Fig. 9, so as to permit of slight lateral adjustment of such block if desired. The block extends forwardly in the form of a shaft 290 which carries the nut 291 at its foremost extremity. This nut enables the parts to be secured rigidly in place by clamping the same up. For the purpose of securing exact radial adjustments of the block 289, a nut 292, which engages the radial bolt 293, is provided, as will be understood. Each arm or spoke of this roulette is formed by a pair of spring fingers 294 and 295, which, adjacent their extremities, provide V-shaped generally horizontally extending nicks 296 adapted to engage the corners of the hexagonal nut-blanks and hold the same with sufficient firmness by reason of the spring tension of the arms or fingers 294 and 295. These fingers are in turn secured to the tong-blocks 289 by means of appropriate nuts and bolts, indicated by 297. This roulette is arranged and disposed as shown more clearly by Fig. 1, so that as the shaft 283 is intermittently rotated through an angle of 60 degrees, the blank supporting devices, or spring fingers, of the roulette will successively pass by a position directly opposite the plunger 278 which forces the blank from the above-described vertically moving carrier to the finger of the roulette which is at the instant in registry therewith. In this way every time the plunger 278 operates, a nut-blank will be positioned in the roulette. The blank is first carried through a sixth of a revolution of the roulette, as indicated by the arrow on Fig. 8, so as to bring it into position opposite the flattening punch 298 which is mounted on one end of the double-ender reciprocating punching head. The nut-blank is supported from the other side by the anvil 299 which is adjustably mounted in the stationary part of the main frame as by means of the adjusting screw 300. This is shown best by Fig. 9. After this operation, the roulette is again turned through 60 degrees, bringing the blank opposite the crowning-die 301, shown in front end elevation by Fig. 8 and in rear elevation by Fig. 10. This crowning-die has the form of an elongated cylinder which is secured to the main frame by means of the engaging screw threads 302, and is adjusted therein by turning the nut forming its rear, exposed end. The working end of this die is countersunk, as indicated by 303, so that, during the advance of the plunger 304 carried by the reciprocating head, the nut-blank will be forced into this recess 303 and thus be given a "crown." It may be stated in this connection that since the forces employed during this operation are considerable, there is a tendency for the nut-blank to more or less firmly adhere to the die 301, and to that end means are provided for forcing the same out of such die to enable the crowned blank to be carried along by the spring arms of the roulette and positioned opposite the repunching die. This ejector consists of a plunger 305 which reciprocates in the central bore of the crown-die 301 and which may assist in partially forming the crown. This plunger 305 preferably has enlarged bearing portions 306 and 307, and protrudes from the rear of the frame in the form of a screw-threaded shank 308 which is tapped to the gudgeon bolt 309 and locked thereon by means of the nut 310. This gudgeon bolt provides usually right and left bearing pins or gudgeons 311. These pins are seated in the bifurcated ends 312 of the safety lever 313. This lever is of compound character, and comprises an upper member 314 which is pivoted to the lower member 313 by means of the pivot pin 315, but is normally prevented from angular movement relative thereto by means of the safety shear pin 316. This shear pin 316 is constructed of steel sufficiently soft to give way under excessive strains so as to prevent fracture of other parts of the mechanism. This lever is in turn secured to the end of the shaft 317, which is mounted in bearings 318 secured to the rear end of the stationary frame, and at its other end this shaft carries the lever 319 which, by means of the rod 320, is connected to one extremity of the cam actuated lever 321 which is pivoted at 322, and at its upper extremity carries the rollers 323 actuated by the cam 324. Accordingly, plunger 305 will be advanced at appropriate intervals and thus will force out the crowned nut-blank, and the latter will be then carried by the roulette to the repunching-die 325, shown on Fig. 8. This repunching-die provides an aperture 326 for receiving the scrap. After the repunching operation, the blank is then carried by the roulette to the retrimming-die 327, shown on Figs. 8 and 9. This retrimming-die has a hexagonal aperture of appropriate size, and when the plunger 328 carried by the main reciprocating head advances, it will force the nut-blank through this hexagonal aperture in the retrimming-die 327, thus shaving off any excess metal on the edges of the blank. Through the successive movements of the plunger 328, the train of blanks is then forced through the die 327, and these blanks in turn ultimately are discharged through the aperture 329, shown by Fig. 10.

*The automatic rotator for the roulette.—* In the foregoing it has been stated that the roulette turns intermittently through angles of 60 degrees for the purpose of successively presenting the nut-blanks carried by the fingers thereof through the several finishing operations. It now becomes necessary to disclose the means instrumental in automatically producing this motion of the roulette. Preliminary to a description of this, it may be pointed out that it is essential that the travel of the roulette shall be very accurately determined so that the blanks may be brought to the exact positions, and in like manner it is equally essential that when these successive positions have been attained, the roulette shall be locked against any slight displacement due to backlash or other causes. This mechanism contains provision for accomplishing these objects and the same may be best understood by referring to Figs. 10, 11 and 12.

The shaft 283 to which the roulette is secured, projects rearwardly from the main frame of the machine and carries three notched wheels, the one being in the nature of a ratchet wheel adapted to co-act with a ratchet mechanism in turning the roulette, the second in the nature of a stop wheel adapted to co-act with a removable stop in limiting the movement in one direction, and the third being in the nature of a stop wheel adapted to co-act with another stop (which is also a safety device) in limiting the movement in the opposite direction, and thus co-act with the second wheel in bringing the roulette to a fixed stationary and accurately determined position.

The ratchet wheel 342 is keyed fast to the shaft 283 a slight distance from the end of the same, and this remaining distance is occupied by the hub 343 of the oscillating ratchet carrier 344. This hub is retained in place by means of an end-plate 346 which is held on the shaft by means of the nut 347. The upper extremity of the ratchet carrier 344 is provided with the ratchet 345 which extends downwardly into engagement with the ratchet wheel 342. This ratchet carrier is oscillated through the instrumentality of the reciprocating arm 348, which, at its lower end, is pivotally connected between the two arms 349 of the ratchet carrier. This arm 348 derives its movement from a roller 350 which rides in contact with the cam 351. Its other extremity 352 may be prevented from side play in any suitable manner, as by connecting the same by sliding block with the shaft 251, as will be readily understood. In consequence with this arrangement a rotation of the shaft 251 will cause the arm 348 to reciprocate and thus intermittently rotate the roulette shaft.

To prevent an overfeed or excessive partial rotation of the roulette shaft, a stop lever 353 is pivoted at the end of the main frame and terminates in a hardened end adapted to be swung into engagement with the serrated periphery of the wheel 354, thereby arresting the rotation of the latter at a definite and exactly determined point. This lever 353 is inserted and withdrawn through the link 355 moved by the actuating lever 356. This lever is pivoted at an intermediate point 357 to the main frame of the machine and its upper end carries the roller 358 which rides in contact with the periphery of the cam 359, so that during each revolution of the shaft 251 the stop lever 353 will be withdrawn to enable the roulette to be turned and will then be thrown back in place to cause an arrest of its forward rotation at the precisely determined point. Roller 366 may be held in contact with the cam 367 by any suitable means, such as the usual spring.

In order to prevent any reflex action of the roulette, this invention also proposes the third notched wheel 360 which is adapted to be engaged by the suitably pointed end of the plunger 361 which is suitably supported in the bearing 362 adjustably mounted on the main frame of the machine. The rear end of the stop plunger 361 provides the two gudgeons 363 which are engaged by bifurcated end 364 of the actuating lever 365. This lever is pivoted at an intermediate point and at its upper end carries a roller 366 which is actuated by the cam 367. Accordingly, as this cam rotates, the lever 365 will be intermittently operated thus producing a reciprocating action in the stop plunger 361 and thereby releasing or locking the roulette wheel in position as may be appropriate at the instant. Wheels 354 and 360 move with the shaft 283.

By the above described construction is efficiently and accurately accomplished, among others, the objects hereinbefore mentioned. The roulette which supports the nut blanks, and the implements, such as the punches and dies which operate upon the nut blanks and reshape, or refinish, the nut blanks as explained, are associated in a compact structure which yet permits the parts to be made of sufficient size to possess the requisite strength to stand up under the relatively heavy pressures engendered. The gripper fingers 294 and 295, are disposed to support the nut blanks on opposite sides by engagement with peripheral portions of the blanks, so that the faces of the blanks are clear and may be readily operated upon by the punches and dies. The nicks 296 in a measure positively prevent radial movement of the blanks relative to the fingers, so that though the roulette is disposed to rotate in a vertical plane, there is practically no danger of the blank being radially displaced. Thus the nicks assist the grip of the fingers in retaining the blanks from radial displacement. The punches and dies coöperate in a line which intersects the rotary path of the gripper fingers, being relatively movable in such line, the dies being preferably fixed in order that the prime reshaping elements shall remain in the desired radial and circumferential relative positions opposite positions of rest of the intermittently rotating fingers.

Having described our invention, what we claim as new and desire to secure by Letters Patent is:—

1. A machine of the nature disclosed comprising, in combination, an intermittently rotatable member, nut blank supporting means rotatable with said member and comprising a plurality of pairs of gripper fingers adapted to engage peripheral portions of nut blanks, the members of said pairs being relatively movable toward and from each other, nut blank reshaping means comprising a plurality of pairs of punches and dies mounted to operate on the faces of nut blanks held by said fingers when said supporting means is at rest, the members of said pairs of punches and dies being adapted to have relative movement in a line intersecting the rotary path of movement of said gripper fingers, a reciprocatory head to which said punches are secured, and means adapted to intermittently rotate said first-mentioned member.

2. A machine of the nature disclosed comprising, in combination, an intermittently rotatable member, nut blank supporting means rotatable with said member and comprising a plurality of pairs of spring fingers adapted to engage peripheral portions of nut blanks, the members of said pairs being relatively movable toward and from each other, nut blank reshaping means comprising a plurality of pairs of punches and dies mounted to operate on the faces of nut blanks held by said fingers when said supporting means is at rest, the members of said pairs of punches and dies being adapted to have relative movement in a line intersecting the rotary path of movement of said gripper fingers, a reciprocatory head to which said punches are secured, and means adapted to intermittently rotate said first-mentioned member.

3. A machine of the nature disclosed comprising, in combination, an intermittently rotatable member, nut blank supporting means rotatable with said member and comprising a plurality of pairs of spring fingers adapted to engage peripheral portions of nut blanks, nut blank reshaping means comprising a plurality of pairs of implements mounted to operate on the faces of nut blanks held by said fingers when said supporting means is at rest, the members of said pairs of implements being relatively movable in a line intersecting the rotary path of movement of said fingers, and means adapted to intermittently rotate said first mentioned member.

4. A machine of the nature disclosed comprising, in combination, an intermittently rotatable member mounted to rotate in a vertical plane, nut blank supporting means rotatable with said member and comprising a plurality of pairs of radially extending spring fingers having horizontally extending nicks adapted to engage peripheral portions of nut blanks, nut blank reshaping means comprising a plurality of pairs of implements mounted to operate on the faces of nut blanks held by said fingers when said supporting means is at rest, the members of said pairs of implements being relatively movable in a line intersecting the rotary path of movement of said fingers, and means adapted to intermittently rotate said first mentioned member.

5. A machine of the nature disclosed comprising, in combination, an intermittently rotatable member, nut blank supporting means rotatable with said member and comprising a plurality of pairs of spring gripper fingers adapted to engage peripheral portions of nut blanks, the members of said pairs being relatively movable toward and from each other, nut blank reshaping means comprising a plurality of pairs of implements mounted to operate on the faces of nut blanks held by said fingers when said supporting means is at rest, the members of said pairs of implements being relatively movable in a line intersecting the rotary path of movement of said gripper fingers, means adapted to intermittently rotate said first mentioned member, and means separate from said last-mentioned means adapted to stop each of the intermittent rotary movements of said blank supporting means when in exact blank supporting position relative to said reshaping implements.

6. A machine of the nature disclosed comprising, in combination, an intermittently rotatable member, nut blank supporting means rotatable with said member and comprising a plurality of pairs of gripper fingers adapted to engage peripheral portions of nut blanks, the members of said pairs being relatively movable toward and from each other, nut blank reshaping means comprising a plurality of pairs of implements mounted to operate on the faces of nut blanks held by said fingers when said supporting means is at rest, the members of said pairs of implements being relatively movable in a line intersecting the rotary path of movement of said gripper fingers, means adapted to intermittently rotate said first mentioned member, means adapted to stop each of the intermittent rotary movements of said blank supporting means when in exact blank supporting position relative to said reshaping implements, and separate means adapted to lock said blank supporting means in said last mentioned position.

7. A machine of the nature disclosed comprising, in combination, a rotatable member, a radially disposed guide on said member, a block radially adjustable on said guide, means to clamp said block in adjusted position, and a radially disposed pair of blank gripping fingers carried by said block.

8. A machine of the nature disclosed comprising, in combination, a rotatable member, a radially disposed guide on said member, a block radially adjustable on said guide, a second block transversely adjustable on said first mentioned block, means to clamp said blocks in adjusted positions, and a radially disposed pair of blank gripping fingers carried by said second mentioned block.

9. A machine of the nature disclosed comprising, in combination, a rotatable member, a radially disposed guide on said member, a block radially adjustable on said guide, a second block transversely adjustable on said first mentioned block, means to clamp said blocks in adjusted position, means adapted to adjust said blocks on said guide, and a radially disposed pair of blank gripping fingers carried by said second mentioned block.

10. A machine of the nature disclosed comprising, in combination, a rotatable member having a radial extension, a radially disposed guideway on said extension and a transverse recess therein, a block radially adjustable on said guide, a second block transversely adjustable on said first block having a shaft extending through said recess, gripper fingers carried by said second mentioned block, means adapted to coöperate with said shaft to radially adjust said second mentioned block, and means adapted to clamp said blocks to said rotatable member.

11. A machine of the nature disclosed comprising, in combination, an intermittently rotatable member, nut blank supporting means rotatable with said member and comprising a plurality of pairs of gripper fingers adapted to engage peripheral portions of nut blanks, the members of said pairs being relatively movable toward and from each other, nut blank reshaping means comprising a plurality of non-rotatable punches, means adapted to reciprocate said punches in lines intersecting the rotary path of said fingers opposite positions of rest of blanks supported by said fingers and a plurality of fixed dies respectively disposed opposite said positions of rest of said blanks in alinement with the path of movement of said punches, and means adapted to intermittently rotate said first mentioned member.

12. A machine of the nature disclosed comprising, in combination, an intermittently rotatable member, nut blank supporting means rotatable with said member and comprising a plurality of pairs of gripper fingers adapted to engage peripheral portions of nut blanks, the members of said pairs being relatively movable toward and from each other, nut blank reshaping means comprising a plurality of pairs of implements mounted to operate on the faces of nut blanks held by said fingers when said pairs of fingers are at rest, the members of said pairs of implements being relatively movable in a line intersecting the rotary path of movement of said gripper fingers, means adapted to intermittently rotate said member, an ejector plunger disposed opposite a predetermined position of rest of said fingers, and means adapted to move said plunger against the blank carried by said fingers in such predetermined position of rest and cause said blank to move relative to one of said implements.

13. A machine of the nature disclosed comprising, in combination, an intermittently rotatable member, nut blank supporting means rotatable with said member and comprising a plurality of pairs of gripper fingers adapted to engage peripheral portions of nut blanks, the members of said pairs being relatively movable toward and from each other, nut blank reshaping means comprising a plurality of pairs of implements mounted to operate on the faces of nut blanks held by said fingers when said pairs of fingers are at rest, the members of said pairs of implements being relatively movable in a line intersecting the rotary path of movement of said gripper fingers, means adapted to intermittently rotate said member, an ejector plunger disposed opposite a predetermined position of rest of said fingers, and means adapted to move said plunger against the blank carried by the fingers in such predetermined position of rest and cause said blank to move relative to one of said implements, comprising a rock lever operatively connected to said plunger, said lever including two parts held in fixed relation by a frangible element.

14. A machine of the nature disclosed, comprising, in combination, a roulette having a plurality of radial spring-arms adapted to support nut blanks, a rotator for turning said roulette step by step to successively position said arms, and a mechanism comprising a plurality of implements adapted to simultaneously operate on the blanks carried by said arms.

15. A machine of the nature disclosed comprising, in combination, a rotatable roulette, a serrated wheel and a ratchet wheel mounted to rotate therewith, a pawl, means adapted to operate said pawl to intermittently rotate said ratchet wheel, a stop, and means adapted to move said stop into the path of the teeth of said serrated wheel between its intervals of motion.

16. A machine of the nature disclosed comprising, in combination, a rotatable shaft, a roulette mounted to rotate with said shaft, a serrated wheel and a ratchet wheel fixed to said shaft, a hub rotatably mounted on said shaft carrying a pawl adapted to engage said ratchet wheel, a lever adapted to engage said serrated wheel, a cam shaft, and operative connections between said cam shaft and said hub and said lever adapted to oscillate said hub and said lever.

17. A machine of the nature disclosed comprising, in combination, a rotatable shaft, a roulette mounted to rotate with said shaft, two toothed wheels and a ratchet wheel fixed to said shaft, a hub journaled on said shaft carrying a pawl disposed to engage said ratchet wheel, stop elements one for each of said notched wheels, a cam shaft, and operative connections between said cam shaft and said hub and said stop elements adapted to oscillate said hub, and to move one of said stop elements into the path of a tooth of one of said toothed wheels during its intervals of motion, and the other stop element into engagement with its adjacent wheel when the latter is at rest.

18. In an apparatus of the character described, in combination, a press element comprising a reforming tool. a second press element, means adapted to cause relative approaching movement between said elements to press and thereby reform a blank and relative separating movement therebetween to relieve said pressure, and a blank carrier movable transversely of the line of relative movement between said press elements, said carrier comprising spring fingers adapted to grip a blank and permit relative movement of the blank and fingers under the pressure of said elements.

19. In an apparatus of the character described, in combination, a press element comprising a reforming tool, a second press element, means adapted to cause relative approaching movement between said elements to press and thereby reform a blank and relative separating movement therebetween to relieve said pressure, and a blank carrier movable transversely of the line of relative movement between said press elements, said carrier comprising blank holding spring fingers movable across the path of relative movement between said elements and adapted to permit relative movement of the blank and said fingers under the pressure of said element.

In testimony whereof we affix our signatures, in the presence of two witnesses.

WILLIAM L. WARD.
HERBERT D. REMSEN.
EMILE C. BOERNER.

Witnesses:
ROBERT J. SNYDER,
HOWARD E. MARSHALL.